United States Patent [19]
Lowy

[11] 3,811,781
[45] May 21, 1974

[54] MULTI-WAVELENGTH PHOTOMETER EMPLOYING A ROTATING VARIABLE WAVELENGTH FILTER

[75] Inventor: George W. Lowy, Silver Spring, Md.

[73] Assignee: Baxter Laboratories, Inc., Morton Grove, Ill.

[22] Filed: Jan. 26, 1973

[21] Appl. No.: 326,495

[52] U.S. Cl.................. 356/188, 356/51, 356/97, 356/189
[51] Int. Cl............................................. G01j 3/48
[58] Field of Search........... 356/99, 51, 96, 97, 100, 356/189, 188

[56] References Cited
UNITED STATES PATENTS
3,695,764  10/1972  Delmas et al...................... 356/97
3,449,050  6/1969  Keahl................................... 356/99

Primary Examiner—Ronald L. Wibert
Assistant Examiner—V. P. McGraw
Attorney, Agent, or Firm—Herman L. Gordon

[57] ABSTRACT

A multi-wavelength photometer using a two-segment rotating circular variable filter to select the working wavelengths. Selection is made by gating respective integrating circuits receiving signals generated by a light beam passing through the filter and the sample cuvette. The gating signals are produced by variable delay circuits triggered respectively by timing pulses derived from an apertured timing disc mounted on the same shaft as the rotating filter. The timing pulses are generated by spaced photo diodes located adjacent the timing disc and receiving light through the aperture of the timing disc as it passes.

13 Claims, 4 Drawing Figures

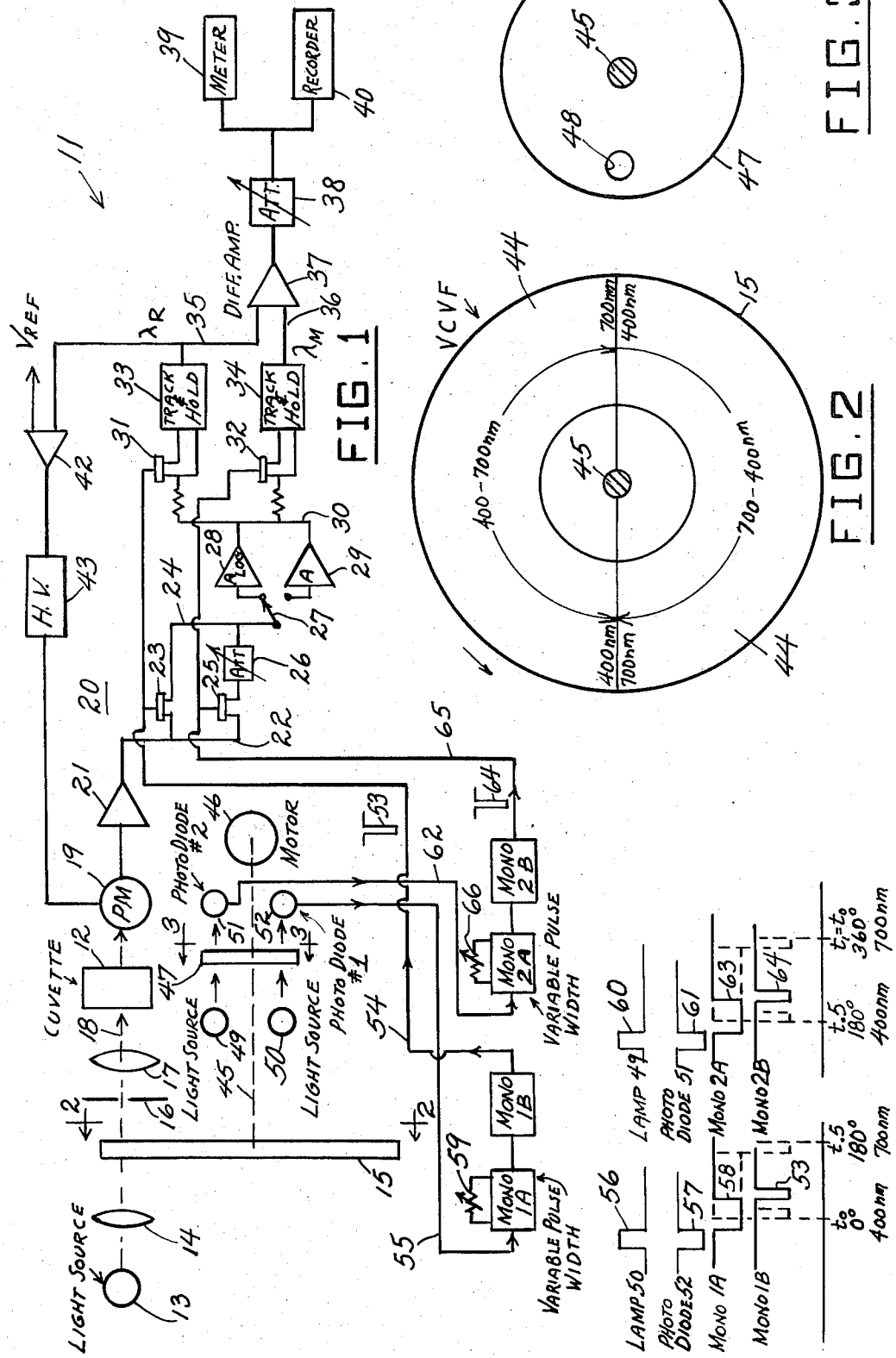

MULTI-WAVELENGTH PHOTOMETER EMPLOYING A ROTATING VARIABLE WAVELENGTH FILTER

This invention relates to multi-wavelength photometers, and more particularly to a multi-wavelength photometer of the type employing a rotating filter wheel for selecting the various working wavelengths to be employed in the photometer.

A main object of the invention is to provide a novel and improved mutli-wavelength photometer wherein absorbances at a plurality of externally selectable wavelengths can be measured in rapid succession or absorbance differences can be measured using a wavelength pair wherein the wavelength components can be selected over a wide continuous range, independently of each other.

A further object of the invention is to provide the improved multi-wavelength photometer apparatus wherein the working wavelengths can be readily and accurately selected independently of each other and in a reliable manner, the apparatus involving relatively simple and inexpensive components, being easy to operate, having relatively few parts, being stable in operation, and wherein the optical system of the apparatus is inherently synchronized with the electrical readout system of the apparatus.

Further objects and advantages of the invention will become apparent from the following description and claims, and from the accompanying drawings, wherein:

FIG. 1 is a schematic block diagram showing the components of a typical multi-wavelength photometer constructed in accordance with the present invention.

FIG. 2 is an enlarged vertical cross-sectional view taken substantially on the line 2—2 of FIG. 1.

FIG. 3 is an enlarged vertical cross-sectional view taken substantially on the line 3—3 of FIG. 1.

FIG. 4 is a graph showing the sequences in the development of the gating signals employed in the apparatus of FIG. 1.

Referring to the drawings, 11 generally designates a typical multi-wavelength photometer according to the present invention, arranged as a dual wavelength photometer to measure difference of absorption at two wavelengths $\lambda_R$ and $\lambda_M$ passing through a sample contained in a cuvette 12. In the illustrative example diagrammatically shown in FIG. 1, a wide-range light source 13 is provided, for example, a source of white light. The output of source 13 is directed by a lens 14 through rotating circular filter disc 15, presently to be described, and through a slit plate 16 and a focussing lens 17 to provide a beam 18, which is time-shared to alternately comprise the two wavelengths $\lambda_R$ and $\lambda_M$, as will be explained. The time-shared beam passes through the sample cuvette 12 and impinges on a photomultiplier tube 19.

The photomultiplier tube 19 forms part of a response circuit 20 generally similar to that disclosed in the patent application of George W. Lowy et al., Ser. No. 291,046, filed Sept. 21, 1972, entitled "Dual Wavelength Photometer for Absorbance Difference Measurements." In the circuit 20, the time-spaced signals generated in the photomultiplier tube 19 are delivered through a current-to-voltage amplifier 21 to a wire 22. Wire 22 is connected through a first electronic switch device 23 to a conductor 24, and is likewise connected through a second electronic switch device 25 and a variable attenuator 26 to conductor 24. Conductor 24 is connected through a 2-position selector switch 27 either to the input of a logarithmic amplifier 28 or a linear amplifier 29. The outputs of amplifiers 28 and 29 are connected to a conductor 30. Conductor 30 is connected through appropriately triggered electronic switch devices 31 and 32 to "track and hold" integrating circuits 33 and 34, which respectively generate steady d.c. output voltages representing the time-spaced signal pulses furnished to the conductor 30. These two steady d.c. output voltages, applied respectively to output conductors 35 and 36, are applied simultaneously to the two inputs of a differential amplifier 37. The output of amplifier 37, which substantially comprises the difference between the steady d.c. input signals from conductors 35 and 36, is delivered through a variable attenuator 38, employed for calibration, to a meter 39 and a recorder 40.

The electronic switch devices 23, 25, 31 and 32 may comprise field effect transistors.

In order to compensate for the nonlinearity of the response characteristic of the photomultiplier tube 19, the dynode voltage thereof is regulated in accordance with the steady d.c. voltage derived at the output of the integrating circuit 33. Thus, the output voltage of circuit 33 is compared with a reference voltage in a differential amplifier 42 and the output signal of amplifier 42 is utilized in a conventional manner to adjust the voltage output value of a high voltage power supply device 43 furnishing the photomultiplier dynode voltage. This comparison is obtained by connecting the output conductor 35 to one of the input terminals of the differential amplifier 42, as shown.

The filter disc 15 comprises two identical variable filter segments 44,44 cemented together at their diametral edges to form a full circular disc. The segments 44,44 are similar to Visual Circular Variable Filter (VCVF), 180° Segment, manufactured by Optical Coating Laboratory, Inc., Santa Rosa, California, each segment having a spectral range of from 400 to 700 nm. The filter disc 15 is mounted on an axial shaft 45 which is driven by a suitable motor 46. Also mounted on shaft 45 is an opaque timing disc 47 having an aperture 48. Mounted on one side of timing disc 47 at diametrically opposed locations relative to disc 47 and at the same radial distances from its axis as the aperture 48 are respective stationary lamps 49 and 50, and mounted on the other side of disc 47 in longitudinal alignment with the lamps are respective stationary photo diodes 51 and 52.

The slit in slit plate 16 is preferably radially divergent relative to the axis of the disc 15, namely, is substantially wedge-shaped, so as to maximize spectral purity.

The output of photo diode 52 is connected by a conductor 55 to the input of a first variable-delay pulse forming system comprising a variable delay monostable oscillator 1A drivingly connected to a monostable oscillator 1B and arranged to provide a pulse 53 in the output conductor 54 of monostable oscillator 1B at a preset time delay after a light pulse 56 from lamp 50 generates an electrical pulse 57 in photo diode 52. This delay is determined by the width of the pulse 58 generated in monostable oscillator 1A, which is in accordance with the setting of an adjustable impedance 59 provided in oscillator 1A. The trailing edge of pulse 58 triggers monostable oscillator 1B, to thereby generate the narrow output pulse 53.

Similarly, a light pulse 60 from lamp 49 180° later causes photo diode 51 to generate an electrical pulse 61 in its output conductor 62 which is connected to the input of a second variable delay pulse forming system comprising a variable delay monostable oscillator 2A drivingly connected to a monostable oscillator 2B. The pulse 61 generates a variable width pulse 63 in monostable oscillator 2A whose trailing edge triggers monostable oscillator 2B to thereby generate a narrow output pulse 64, which is supplied to its output conductor 65. The width of pulse 63, and hence the time delay, is determined by the setting of an adjustable impedance 66 provided in oscillator 2A.

The range of adjustment of the impedances 59 and 66 corresponds to the time period required for an 180° segment 44 to pass the slit of the slit plate 16, whereby the triggering pulses 53 and 64 may occur at moments when selected wavelengths are provided in the beam 18, said wavelengths being thus individually timeselected from the 400 to 700 nm wavelength range provided by each of the continuous-wavelength filter segments 44, 44.

The monostable oscillators 1A, 1B, 2A and 2B may be similar to Model No. MC667 manufactured by Motorola Semiconductor Products, Inc., Phoenix, Ariz.

The output conductor 54 of monostable oscillator 1B is connected to the triggering electrodes of the electronic switch devices 23 and 31, whereby said switch devices are simultaneously closed by the pulses 53. Similarly, the output conductor 65 of monostable oscillator 2B is connected to the triggering electrodes of electronic switch devices 25 and 32, whereby these switch devices are simultaneously closed by the pulses 64.

In operation, with a sample to be tested placed in the cuvette 12, the reference wavelength $\lambda_R$ is selected by the adjustment of the variable impedance 59 and the measure wavelength $\lambda_M$ is selected by the adjustment of the variable impedance 66. This establishes the appropriate pulse delay time for each filter segment 44, in the manner above described.

Thus, with motor 46 energized, when the electronic switch devices 23 and 31 close, the signal from photomultiplier tube 19 will be its response to the selected reference wavelength $\lambda_R$, and the steady d.c. voltage applied to the conductor 35 will correspond to this response. Similarly, when the electronic switch devices 25 and 32 close, the signal from photomultiplier tube 19 will be its response to the selected measure wavelength $\lambda_M$, and the steady d.c. voltage applied to conductor 36 will correspond to this response.

The variable attenuator device 26 employed with the $\lambda_M$- gated circuit branch between conductors 22 and 24 is employed for suitably balancing the signals furnished to either amplifier 28 or 29 at the beginning of a test.

While the typical instrument above described utilizes only two selected working wavelengths $\lambda_R$ and $\lambda_M$, in accordance with the present invention, any desired number of working wavelengths or wavelength pairs may be utilized by providing the required additional photo diodes, associated variable delay pulse forming systems, and gated photomultiplier response circuits, similar to those above described. In each case, any particular wavelength contained in the available range can be selected by appropriately adjusting the pulse width of the associated first variable delay monostable oscillator, thereby establishing the cyclic time at which its associated photomultiplier response circuit is gated.

While a specific embodiment of an improved multiwavelength photometer has been disclosed in the foregoing description, it will be understood that various modifications within the spirit of the present invention may occur to those skilled in the art. Therefore it is intended that no limitations be placed on the invention except as defined by the scope of the appended claims.

What is claimed is:

1. A photometer apparatus comprising a radiation source, a photosensitive signal-generating means, means to support a sample between said source and said photosensitive means, a cyclically moving continuously variable filter mounted between said source and said sample-supporting means, said filter having a starting wavelength point, a response circuit connected to said photosensitive means, means to cyclically key said response circuit each time a preselected wavelength filter portion of said cyclically moving filter moves between said source and said sample-supporting means, whereby to generate pulse signals in said response circuit in accordance with the absorbance of the sample at the wavelength passed by said preselected filter portion, and means to adjust the time at which said cyclically keying means keys said response circuit, whereby to vary said preselected filter portion, said timeadjusting means including an electrical time delay circuit operatively connected to said keying means and constructed to provide a keying time delay corresponding to the geometrical spacing between said starting wavelength point and said preselected wavelength portion on said filter, whereby the time delay corresponds to the time required for the continuously variable filter to move through said spacing.

2. The photometer apparatus of claim 1, and means to integrate said pulse signals.

3. The photometer apparatus of claim 1, and wherein said continuously variable filter is of the rotary type.

4. The photometer apparatus of claim 1, and wherein said means to key the response circuit comprises timing pulse-generating means mechanically coupled to said moving variable filter and generating cyclic timing pulses synchronized with the cyclic movement of the filter, keying means in the response circuit, and means drivingly coupling said timing pulse-generating means to said keying means, and wherein said time-adjusting means comprises adjustable delay means in said last-named coupling means.

5. The photometer apparatus of claim 4, and wherein said timing pulse-generating means comprises an apertured opaque member rigidly connected to said moving variable filter, a light source on one side of said opaque member, and a photo diode on the other side of said opaque member located to at times receive light through the aperture of said opaque member.

6. The photometer apparatus of claim 5, and wherein the means drivingly coupling said timing pulse-generating means to said keying means comprises a variable delay pulse-forming circuit connected between said timing pulse-generating means and said keying means.

7. The photometer apparatus of claim 1, and wherein the cyclically moving filter comprises at least two continuously variable successively arranged filter segments moving through the optical path between said source and said sample-supporting means, and wherein means is provided to cyclically key the response circuit each time a preselected portion of each variable filter segment moves between said source and said sample-supporting means, and wherein said time-adjusting means comprises means to adjust the keying time for at least one of the variable filter segments.

8. The photometer apparatus of claim 7, and means to independently adjust the keying time for each variable filter segment.

9. The photometer apparatus of claim 7, and wherein said response circuit comprises respective integrating circuits associated with the variable filter segments, and means to key each integrating circuit when a preselected portion of the associated variable filter segment moves between the source and the sample-supporting means.

10. The photometer apparatus of claim 1, and wherein said response circuit comprises a plurality of respective integrating circuits, and means to key each integrating circuit when a different preselected portion of said cyclically moving filter moves between said source and said sample-supporting means.

11. The photometer apparatus of claim 9, and wherein the continuously variable filter comprises a pair of semicircular continuously variable filter members secured diametrically together to define a filter disc, said disc being rotatably mounted to rotate in the optical path between said source and said sample-supporting means.

12. The photometer apparatus of claim 11, and wherein the means to cyclically key the response circuit comprises an apertured opaque member coaxially secured to the filter disc, light source means on one side of said opaque member, respective diametrically spaced diodes on the other side of said opaque member located to sequentially receive light from said light source means through the aperture of said opaque member and wherein said time-adjusting means comprises respective adjustable time-delayed pulse-forming means drivingly connected between said photo diodes and the respective integrating circuit keying means.

13. The photometer apparatus of claim 12, and wherein said integrating circuits are of the type deriving respective steady d.c. output voltages corresponding to the amplitudes of their input signal pulses, a differential amplifier, means connecting the outputs of said integrating circuits to the respective inputs of the differential amplifier, and indicating means connected to the output of the differential amplifier.

* * * * *

UNITED STATES PATENT OFFICE
CERTIFICATE OF CORRECTION

Patent No. 3,811,781          Dated May 21, 1974

Inventor(s) George W. Lowy

It is certified that error appears in the above-identified patent and that said Letters Patent are hereby corrected as shown below:

Column 1, line 18, after "provide", delete "the" and insert -- an -- .

Signed and sealed this 5th day of November 1974.

(SEAL)
Attest:

McCOY M. GIBSON JR.                C. MARSHALL DANN
Attesting Officer                  Commissioner of Patents